United States Patent [19]

Boyesen

[11] Patent Number: 4,829,946
[45] Date of Patent: May 16, 1989

[54] EXHAUST CONTROL VALVE FOR TWO-STROKE CYCLE ENGINES AND PROCESS FOR USING THE SAME

[75] Inventor: Eyvind Boyesen, Kempton, Pa.

[73] Assignee: Performance Industries, Inc., Kempton, Pa.

[21] Appl. No.: 96,551

[22] Filed: Sep. 15, 1987

[51] Int. Cl.$^4$ ............................................. F02B 75/02
[52] U.S. Cl. ................................. 123/65 PE; 123/323
[58] Field of Search ............. 123/65 PE, 65 A, 65 V, 123/65 P, 323, 340

[56] References Cited

U.S. PATENT DOCUMENTS

| | | | |
|---|---|---|---|
| 1,514,476 | 11/1924 | Still | 123/65 PE |
| 4,121,552 | 10/1978 | Mithuo et al. | 123/65 PE |
| 4,285,311 | 8/1981 | Iio | 123/323 |
| 4,321,893 | 3/1982 | Yamamoto | 123/65 PE |
| 4,325,335 | 4/1982 | Shibata | 123/323 |
| 4,364,346 | 12/1982 | Shiohara | 123/323 |
| 4,391,234 | 7/1983 | Holzleitner | 123/65 V |
| 4,399,788 | 8/1983 | Boutelmann | 123/323 |
| 4,516,540 | 5/1985 | Nerstrom | 123/65 PE |
| 4,672,924 | 6/1987 | Hiasa et al. | 123/65 PE |
| 4,672,925 | 6/1987 | Miyata et al. | 123/65 PE |

FOREIGN PATENT DOCUMENTS 0025030  2/1984  Japan .............................. 123/65 PE

OTHER PUBLICATIONS

The High-Speed Two-Stroke Petrol Engine by Philip H. Smith, 2/1965, pp. 106-113 and 125.

Primary Examiner—David A. Okonsky
Attorney, Agent, or Firm—John W. Logan, Jr.

[57] ABSTRACT

An exhaust control valve for two-stroke cycle engines is disclosed. This valve is within the exhaust passage, seals against the piston, and delays opening of the exhaust passage to the combustion chamber during the expansion stroke of the piston for a preselected number of degrees of rotation of the crankshaft while permitting full opening of the exhaust port during the scavenging cycle. Also disclosed are means for modifying opening of the exhaust valve at high engine speeds to improve scavenging.

13 Claims, 7 Drawing Sheets

EXHAUST CONTROL VALVE FOR TWO-STROKE CYCLE ENGINES AND PROCESS FOR USING THE SAME

BACKGROUND OF THE INVENTION

The present invention relates to new and useful improvements in two-stroke cycle gasoline engines, and more particularly to new and useful improvements in exhaust valves for such engines which will delay the opening of the exhaust port during the expansion stroke and, if desired, advance closing of the exhaust port during the compression stroke while, at the same time, fully opening the exhaust port during scavenging of the cylinder. In addition, the present invention also permits varying the opening and closing of the exhaust port relative to the piston position according to engine speed.

It has been known in the past to provide speed-controlled exhaust valves which will remain partially closed at slow speeds of the engine, delaying communication between the combustion chamber and exhaust passage beyond the usual opening of the exhaust port by the piston, and move upwardly, fully exposing the exhaust passage to the combustion chamber through the exhaust port at high engine speeds. Such valves, however, do not provide the advantages of longer expansion and compression strokes while also permitting maximum scavenging.

With the foregoing in mind, a principal object of the present invention is to provide a novel exhaust control valve for two-stroke cycle engines which will vary the exhaust opening according to a selected pattern during each stroke of the piston.

Another object of the present invention is to provide a novel exhaust control valve for two-stroke cycle engines which, in addition to varying the exhaust opening during each cycle, will further change the exhaust opening with changes of engine speed.

A further object of the present invention is to provide a novel reciprocating exhaust control valve driven in timed relation to the piston movement to delay opening of the exhaust passage during the expansion stroke and advance closing of the exhaust passage during the compression stroke, while fully opening the exhaust passage during scavenging.

Still a further object of the present invention is to provide a novel exhaust control valve for two-stroke cycle engines which may be easily incorporated into an engine and will operate reliably and efficiently.

SUMMARY OF THE INVENTION

An exhaust control valve for two-stroke cycle engines is provided within the exhaust passage of the engine positioned in close proximity to the piston skirt. The valve is interconnected with the engine crankshaft and reciprocates upwardly and downwardly in timed relation to the piston movement to delay opening of the exhaust passage during the expansion stroke of the piston and advance closing of the exhaust passage during the compression stroke of the piston. After the exhaust passage is initially opened, the valve is moved upwardly out of the stream of exhaust gases passing through the exhaust port, fully opening the exhaust port, so as not to interfere with scavenging of the combustion chamber. In addition, an adjustable drive connection is provided between the crankshaft and the valve to permit modification of the position of the valve relative to the piston with a change in engine speed.

DESCRIPTION OF THE DRAWINGS

The operation of the present invention should become apparent from the following description when considered in conjunction with the accompanying drawings, in which.

DETAILED DESCRIPTION OF THE PREFERRED EMBODIMENT

In the illustrated embodiment of the present invention, the exhaust control valve is shown in conjunction with a single cylinder two-stroke cycle, variable speed, crankcase compression engine as used, for example, on motorcycles. This exhaust control valve, however, has useful applications in other than the engine shown.

Figure 1:
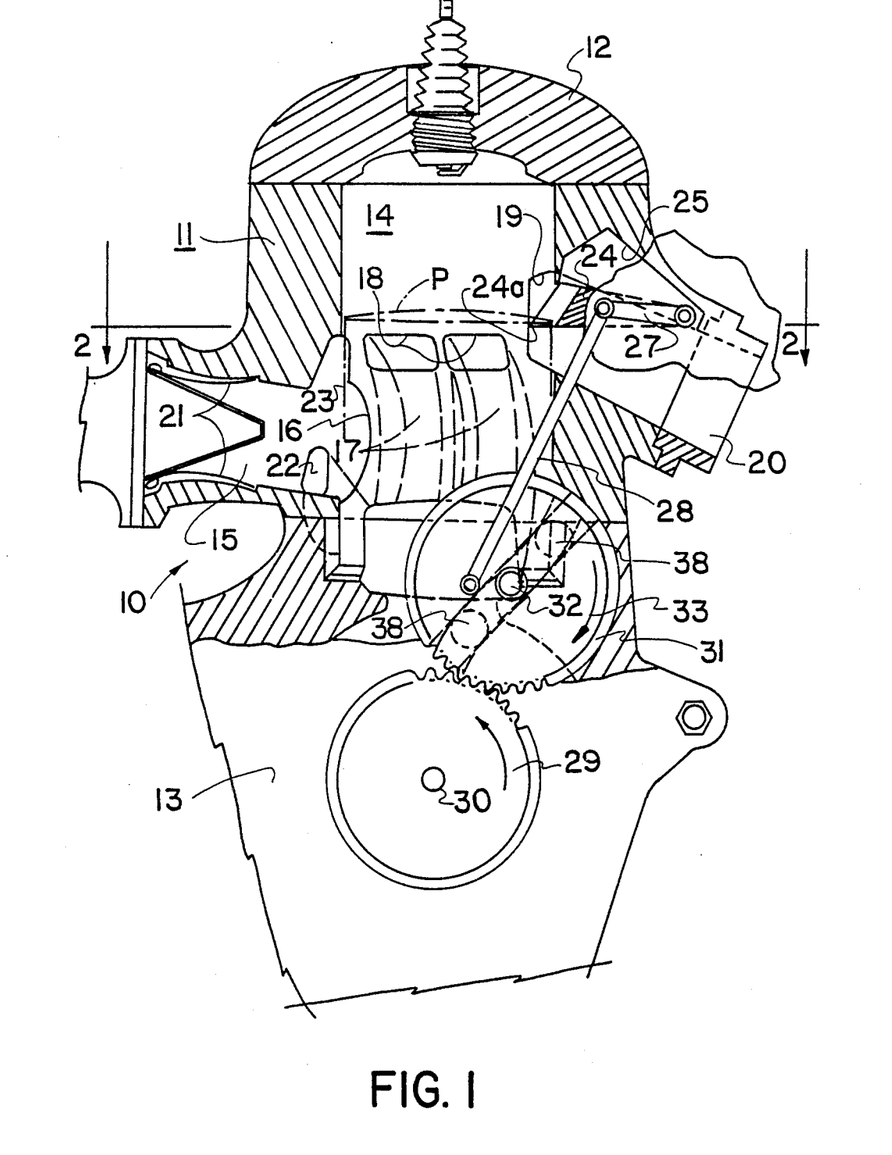
FIG. 1 is a longitudinal sectional view, partially in elevation, of a two-stroke cycle engine incorporating the present invention.

The engine 10 includes a cylinder 11, a cylinder head 12 and a crankcase housing 13, with the piston, connecting rod and crankshaft not shown. The cylinder 11 includes a combustion chamber 14, an inlet passage 15 terminating in the inlet port 16, transfer passages 17,17 terminating in transfer ports 18,18 and an exhaust port leading to the exhaust passage 20. In the inlet there are reed valves 21, a supplement transfer passage 22 and a booster port 23, similar to those described in my prior U.S. Pat. No. 3,905,341.

In this type of engine, the piston skirt, not shown, serves as the valve means for opening and closing the inlet port 16, booster port 23, transfer ports 18 and exhaust port 19. In the conventional engine of this type, as the piston is moving toward its bottom dead center position, the upper edge of the piston starts to open the exhaust port 19 at about the 90° position of the crankshaft, 0° being the crankshaft position at top dead center and 180° being the crankshaft position at bottom dead center. Upon continued further downward movement of the piston, the transfer ports and booster port start to open at approximately the 120° position of the crankshaft. When the piston reaches bottom dead center, all of these above ports are fully uncovered or open. Similarly, on the compression stroke of the piston, the transfer and booster ports are closed by the piston at the 240° position of the crankshaft and the exhaust port is closed by the piston at the 270° position of the crankshaft. Thus, in the conventional engine of this type, the effective expansion stroke of the piston and the effective compression stroke of the piston each occur during only a 90° rotation of the crankshaft.

In accordance with the present invention, valve means are provided to delay fluid communication between the combustion chamber 14 and the exhaust passage 20 during the expansion stroke until after the piston has initially uncovered the upper edge of the exhaust port, but permit such fluid communication prior to the transfer ports being opening. Similarly, this same valve means can shut off fluid communication between the combustion chamber and the exhaust passage prior to the piston closing of the exhaust port. This increases the effective length of the expansion and compression strokes, thereby increasing the power output of the engine.

Figure 2:
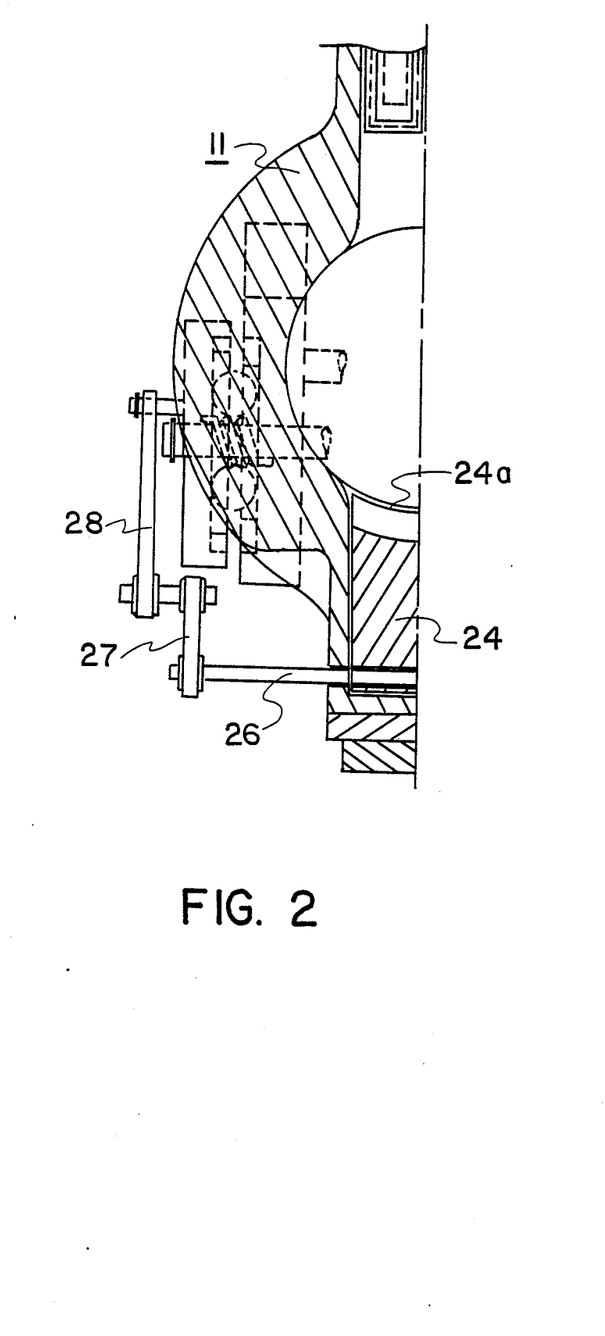
FIG. 2 is a transverse sectional view taken along the line 2—2 of FIG. 1.

In the embodiment of the invention shown, this valve means comprises a flat valve plate 24 pivotally mounted at one end within a recess 25 in the exhaust passage 20. This mounting is accomplished by means of a pivotal valve shaft 26 fixed to and rotatable with valve plate 24 and extending through bushings, not shown, mounted in the cylinder 11 at both sides of exhaust passage recess 25. The valve plate 24 extends forwardly from the valve shaft 26 and terminates at, or just short of, the exhaust port 19. The forward edge 24a of the valve plate is concave when viewed from above, as in FIG. 2, and has a radius of curvature equal to or slightly greater than that of the combustion chamber. This forward edge of the valve plate may also be tapered or curved upwardly and rearwardly so that it can rest in the exhaust passage recess 25.

An important feature of the present invention is the provision of means to move the valve plate 24 in timed relation to movement of the piston. In the position as shown in FIG. 1, the valve plate 24 is approximately midway between the top of the exhaust port 19 and the top of the transfer ports 18, and, upon rotation of the crankshaft, will move upwardly. The upper edge of the downwardly moving piston is, as shown in phantom lines at P, at a position just about passing the upwardly moving valve plate. This would be, in the embodiment shown, at about the 105° position of the crankshaft. In this described position of the piston and the valve plate, a seal is provided between the skirt of the piston and the forward edge of the valve plate, preventing the expanding products of combustion in the combustion chamber from entering the exhaust passage 20. While the upper portion of the exhaust port 19 is uncovered by the piston P, the expanding gases in the combustion chamber cannot enter the exhaust passage due to the fact that the valve plate provides a barrier, with possibly slight leakage, between the area of the combustion chamber 14 above the piston and the exhaust passage 20. With this arrangement, the effective expansion force on the piston is extended from 90° rotation of the crankshaft to approximately 105° rotation of the crankshaft. This increases the length of the power stroke of the piston by more than twenty percent.

Movement of the valve plate 24 is controlled by rotation of the crankshaft of the engine. To this end, the valve shaft 26 is fixed to the valve plate 24 and extends, at one end, outwardly beyond the cylinder 11. An operating link 27 is attached to the valve shaft and, by means of a connecting link 28, is interconnected with the crankshaft of the engine.

As illustrated, a pinion 29 is carried by an extension 30 of the engine crankshaft. This pinion in turn drives a gear 31 in a one-to-one relationship, which gear is carried by a shaft 32. At the end of the shaft 32 is a rotatable drive plate 33 to which the lower end of the connecting link 28 is attached. A drive connection, more fully described hereafter, is provided between the gear 31 and the drive plate 33 to cause the plate 33 to rotate with the gear 31. Thus, the valve plate 24 is driven from the crankshaft of the engine in timed relation to movement of the piston.

During downward movement of the piston, the valve plate 24 is moving upwardly as shown in FIG. 1. When the forward edge 24a of the valve plate is higher than the upper edge of the piston, products of combustion may exit from the combustion chamber into the exhaust passage. With continued rotation of the crankshaft, the valve plate continues rising until it is completely within the exhaust passage recess 25, thereby permitting unrestricted flow of exhaust gases through the exhaust passage.

Figure 4:
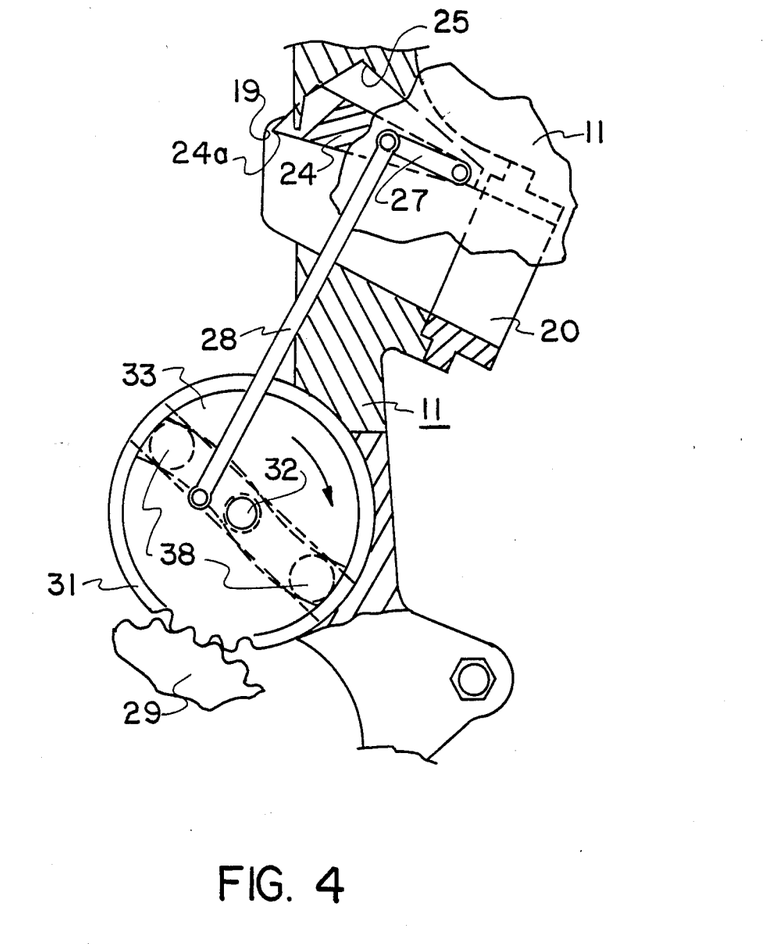
FIG. 4 is a representation of the exhaust control valve drive mechanism at high speed of the engine.
Figure 5:
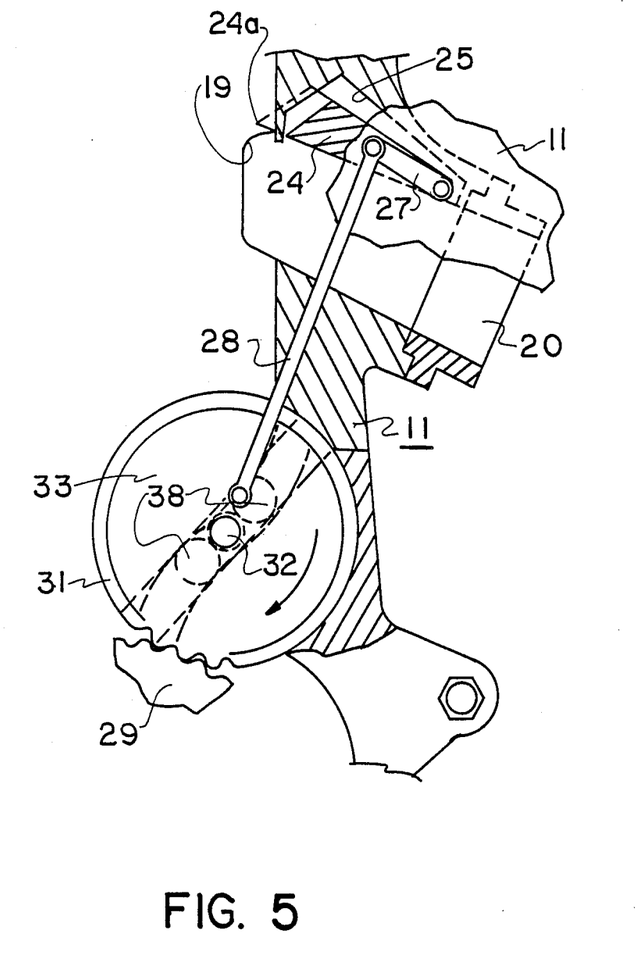
FIG. 5 is a representation of the exhaust control valve drive mechanism at slower speeds of the engine.
Figure 6:
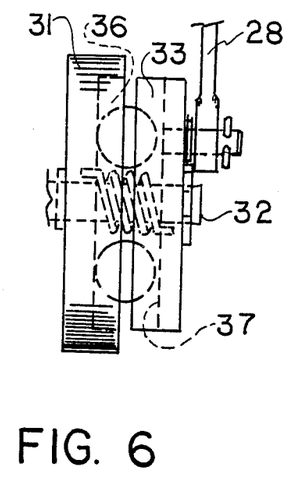
FIG. 6 is a side elevational view of the exhaust control valve drive mechanism.
Figure 7:
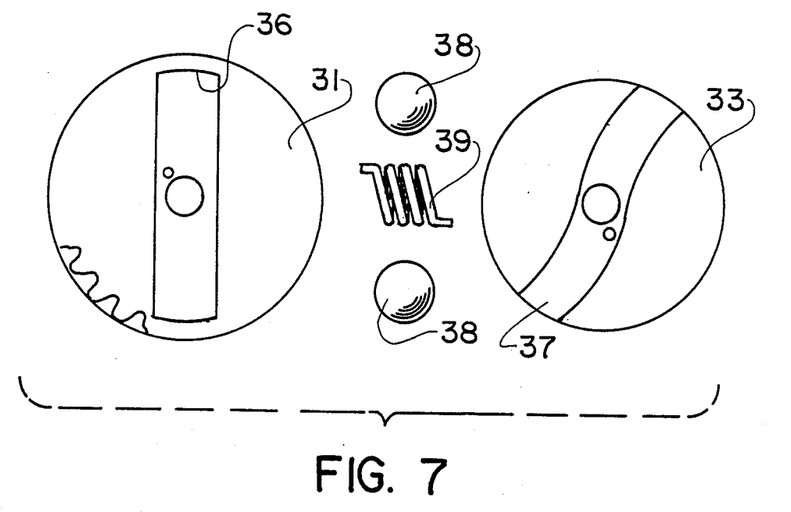
FIG. 7 is an exploded view of the elements of the exhaust control valve drive mechanism.

At high engine speeds, it may be necessary to advance opening of the exhaust passage to allow adequate time for scavenging. One method of advancing opening of the exhaust passage is shown in FIGS. 4 through 7, inclusive. As illustrated, the gear 31 is provided with a diametrical recess 36 in the face adjacent the drive plate 33, while the adjacent drive plate face is provided with an S-shaped recess 37. A pair of hardened drive balls 38 are provided engaged within each recess 36, 37, at opposite sides of the shaft 32 and cause the drive plate 33 to rotate with the gear 31. A torsion spring 39 surrounding the shaft 32 normally urges the drive plate 33 in the counterclockwise direction relative to the gear 31, as viewed in FIG. 5, forcing the balls 38 inwardly toward the shaft 32. When the engine approaches high speed, centrifugal force will drive the balls radially outward against the torsion of the spring 39, rotating the drive plate 33 clockwise relative to the gear 31, as shown in FIG. 4. This will advance upward movement of the valve plate during the expansion stroke of the piston, opening the exhaust passage earlier than at slow or moderate speeds of the engine, allowing more time for scavenging the chamber 14.

Figure 8:
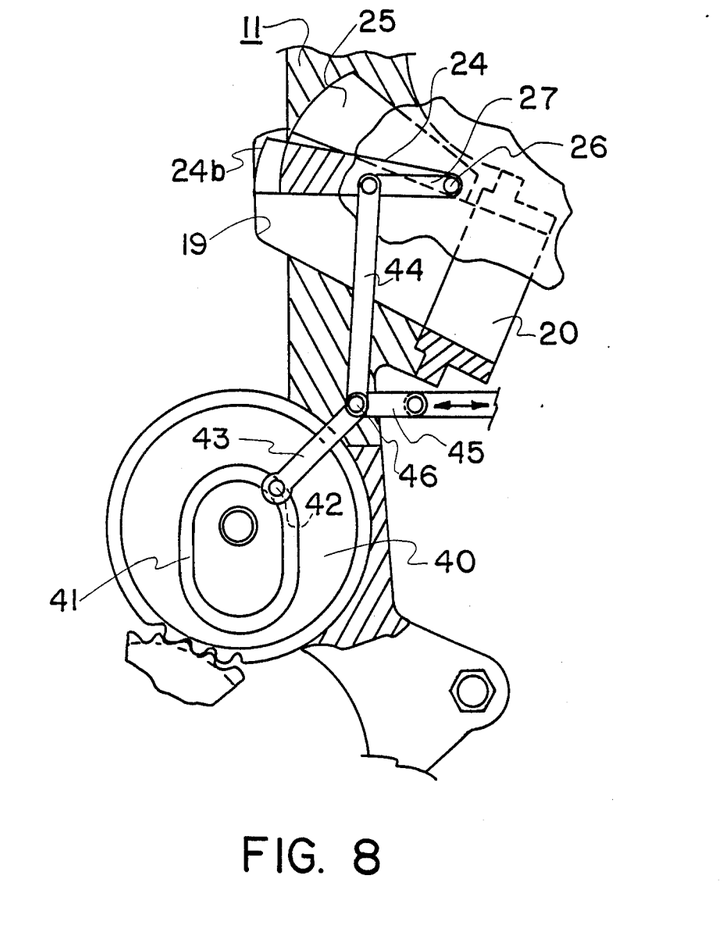
FIG. 8 is a side elevational view of a modified exhaust control valve drive mechanism.

A modified drive for the valve 24 is illustrated in FIG. 8. In this embodiment, the drive plate also has a concave forward edge 24b but is rounded upwardly, instead of tapered, to provide constant clearance with the piston over a longer period of relative movement between the piston and valve plate. A rotatable drive plate 40 fixed to the crankshaft or driven by the crankshaft has a cam track recess 41 in its face, within which a cam roller 42, carried by the lower member 43 of a bifurcated linkage 43,44, is received. The upper link member 44 of the bifurcated linkage is connected to the operating link 27 to cause reciprocation of the valve plate 24 upon rotation of the drive plate 40. An idler link 45 is provided connected to the pivotal connection 46 of the link members 43 and 44. This idler link 45 can be moved horizontally to the right or left, with respect to FIG. 8, in accordance with variations in the engine speed and thus advance opening of the exhaust passage at high engine speed and retard the same at low engine speed.

Figure 3:
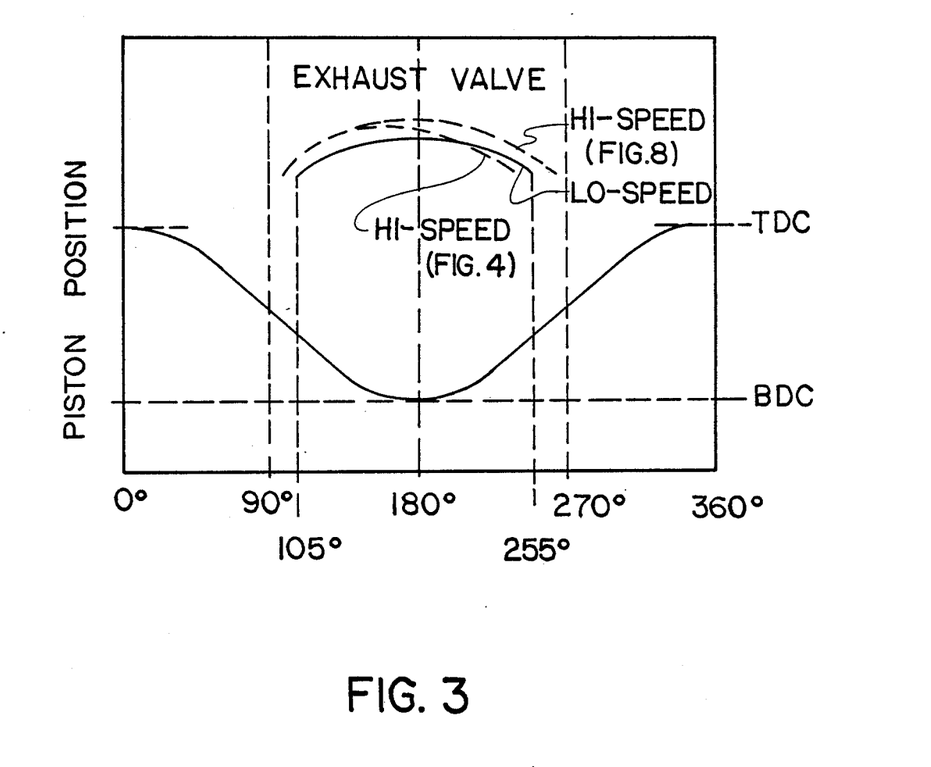
FIG. 3 is a chart showing piston position and exhaust valve position relative to crankshaft rotation.

The chart of FIG. 3 illustrates with the graph A a plot of piston position versus crank angle. Graph B is a plot of the movement of the valve plate during the time the exhaust passage is open to the combustion chamber at low and moderate engine speeds, while graph C is a plot of movement of the valve plate when the exhaust passage is open at high engine speeds. While plot B shows the exhaust passage being opening at 105° of crank angle and closed at 255° C. of crank angle, there is flexibility in the design, and the exhaust passage can be designed to open anywhere between a 90° and 120° crank angle and close anywhere up to a 270° crank angle.

While particular embodiments of the present invention have been illustrated and described herein, it should be apparent that changes and modifications may be incorporated and embodied therein within the scope of the following claims.

What is claimed is:

1. A process for operating a two-stroke cycle internal combustion engine having a piston connected to a crankshaft and reciprocating between the top and bottom of a cylinder including the steps of:
    initiating opening of an exhaust passage by the piston at between approximately 105° and 120° of crankshaft rotation from top dead center;
    closing the exhaust passage by the piston at between approximately 240° and 270° of crankshaft rotation from top dead center; and
    elevating the upper surface of the effective exhaust passage toward the top of the cylinder after initial opening thereof and before the crankshaft reaches 180° rotation from top dead center.

2. A process in accordance with claim 1 including the step of initiating the opening of the exhaust passage by the piston at an earlier position of rotation of the crankshaft at high engine speeds than at slower engine speeds.

3. In a two-stroke cycle internal combustion engine having an exhaust port leading to an exhaust passage and a piston reciprocating between top and bottom dead center positions in a cylinder, said piston being interconnected with a rotatable crankshaft;
    a valve member adjacent the exhaust port adapted to seal against the piston, and
    actuating means for said valve member to move said valve member from a first position at a location adjacent the edge of said exhaust port closest to the top of the cylinder to a second position sealing against the piston closing said exhaust passage,
    said actuating means being in timed relation with said crankshaft rotation and piston movement to move said valve member from said second position toward said first position after the upper edge of said piston passage downwardly below the upper edge of the exhaust port, and to start moving said valve member from said first position toward said second position after said piston reaches its bottom dead center position.

4. Apparatus in accordance with claim 3 including adjustable drive means interconnected with said actuating means to advance movement of said valve member from said second position to said first position with increased speed of rotation of said crankshaft.

5. Apparatus in accordance with claim 3 wherein said valve member reciprocates between said first and said second position.

6. In a two-stroke cycle internal combustion engine including a cylinder, a combustion chamber in the cylinder, an exhaust port spaced from and below the upper end of the combustion chamber leading to an exhaust passage, and a piston carried within said combustion chamber for reciprocation between top and bottom dead center positions, said piston being interconnected with a rotatable crankshaft and functioning as a valve member to open and close said exhaust port;
    a recess provided in said exhaust passage;
    a valve member mounted at least partially within said exhaust passage recess for reciprocal movement between a first position within said recess and a second position intermediate upper and lower edges of said exhaust port,
    said valve member in its second position providing a substantially gas-tight seal with said piston preventing fluid flow from said combustion chamber to said exhaust passage;
    and actuating means interconnected with said valve member and said crankshaft to move said valve member between said first and second positions in timed relation to movement of said piston.

7. Apparatus in accordance with claim 6 including adjutable drive means interconncted with said actuating means to advance movement of said valve member from said second position to said first position with increased speed of rotation of said crankshaft.

8. Apparatus in accordance with claim 7 in which said adjustable drive means includes means responsive to centrifugal force generated due to rotation of the crankshaft.

9. Apparatus in accordance with claim 6 including means in said recess pivotally mounting said valve member for movement betwen said first and second positions.

10. Apparatus in accordance with claim 9 wherein said valve member is a generally flat plate having a concave forward edge facing toward the piston, said forward edge having a radius of curvature in a plane perpendicular to the direction of movement of the piston approximately equal to that of the piston.

11. Apparatus in accordance with claim 7 wherein said actuating means includes a drive plate rotatably driven from the engine crankshaft, and said adjustable drive means includes means responsive to centrifugal force to modify the angular position of said drive plate with respect to the angular position of said crankshaft.

12. Apparatus in accordance with claim 7 wherein said actuating means includes a cam and cam follower.

13. Apparatus in accordance with claim 6 in which, as said piston is moving toward its bottom dead center position in sealing relation with said valve member, said actuating means is moving said valve member in the opposite direction toward its said first position.

* * * * *

UNITED STATES PATENT AND TRADEMARK OFFICE
CERTIFICATE OF CORRECTION

PATENT NO. : 4,829,946
DATED : May 16, 1989
INVENTOR(S) : Eyvind Boyesen

It is certified that error appears in the above-identified patent and that said Letters Patent is hereby corrected as shown below:

Col. 2, line 40 - after "exhaust port" insert --19--

Col. 4, line 65 - "opening" should be --opened--

Col. 4, line 66 - after "255°" delete "C."

Col. 5, line 43 - "passage" should be --passes--

Signed and Sealed this

Tenth Day of October, 1989

Attest:

DONALD J. QUIGG

*Attesting Officer*  *Commissioner of Patents and Trademarks*